US008022348B2

United States Patent
Namba et al.

(10) Patent No.: US 8,022,348 B2
(45) Date of Patent: Sep. 20, 2011

(54) PROJECTION TYPE DISPLAY APPARATUS HAVING A CONTROLLING UNIT FOR CONTROLLING A ROTATION RATE OF THE FAN OF A COOLING UNIT WITH REFERENCE TO INFORMATION REGARDING LIGHTING STATE OF LIGHT SOURCES

(75) Inventors: Shu Namba, Osaka (JP); Naoko Yamashita, Hyogo (JP); Daisuke Yaeo, Osaka (JP)

(73) Assignee: Panasonic Corporation, Osaka (JP)

( * ) Notice: Subject to any disclaimer, the term of this patent is extended or adjusted under 35 U.S.C. 154(b) by 293 days.

(21) Appl. No.: 12/504,904

(22) Filed: Jul. 17, 2009

(65) Prior Publication Data

US 2010/0026965 A1   Feb. 4, 2010

(30) Foreign Application Priority Data

Jul. 31, 2008  (JP) ................................. 2008-197320

(51) Int. Cl.
*G01J 1/32* (2006.01)

(52) U.S. Cl. ..................................... 250/205; 250/208.1

(58) Field of Classification Search .................. 250/205, 250/208.1, 238, 231.1; 353/52, 57, 85; 362/580, 362/294, 345

See application file for complete search history.

(56) References Cited

U.S. PATENT DOCUMENTS

| 6,224,217 | B1 | 5/2001 | Tanaka |
| 7,040,762 | B2 * | 5/2006 | Yasuda ........................... 353/52 |
| 2002/0048172 | A1 | 4/2002 | Wada et al. |

FOREIGN PATENT DOCUMENTS

| JP | 2000-171901 A | 6/2000 |
| JP | 3581568 B2 | 7/2004 |
| JP | 2006-106409 A | 4/2006 |

* cited by examiner

*Primary Examiner* — Que T Le

(74) *Attorney, Agent, or Firm* — Hamre, Schumann, Mueller & Larson P.C.

(57) ABSTRACT

A projection type display apparatus includes a plurality of light sources 7*a*-7*d*, a display device unit 5, a light-combining unit 3 that combines output light from the plural light sources, a condensing unit 4 that propagates output light from the light-combining unit to the display device unit, and a projecting unit 6 that projects an image by the use of output light from the display device unit. In the projection type display apparatus, cooling units having fans 21*a*-21*d* are disposed respectively on the plural light sources, and a controlling unit 31 is provided to control the cooling units. Information regarding the lighting state of the plural light sources is inputted into the controlling unit, and the controlling unit controls a rotation rate of the fans of the cooling units with reference to the information. Concerning a case of temperature management of a plurality of light sources used, an accurate and reliable control is performed; problems such as whitening of the light sources, degradation of life property, blacking, brightness degradation and the like are suppressed, thereby high quality and high reliability are obtained.

5 Claims, 11 Drawing Sheets

PROJECTION TYPE DISPLAY APPARATUS HAVING A CONTROLLING UNIT FOR CONTROLLING A ROTATION RATE OF THE FAN OF A COOLING UNIT WITH REFERENCE TO INFORMATION REGARDING LIGHTING STATE OF LIGHT SOURCES

BACKGROUND OF THE INVENTION

1. Field of the Invention

The present invention relates to a projection type display apparatus such as a projector having a cooling means for cooling a light source as a light emitter. In particular, the present invention relates to technology for cooling properly the light sources of a projection type display apparatus using a plurality of light sources.

2. Description of Related Art

A projection type display apparatus such as a projector has been known as an apparatus for obtaining an image on a big screen. The projection type display apparatus modulates light from a light source lamp with a video signal so as to form an optical image and radiates, by using an image display device such as DMD (Digital Micromirror Device) or a liquid crystal, thereby projecting the optical image in a magnified manner on the screen by the use of a projection lens.

The light source lamp is filled with mercury, a rare gas, a metal halide and the like. When a predetermined voltage is applied to the electrode in the light source lamp, a discharge arc occurs and the filler gas inside the lamp is convected. The discharge arc is curved to form an arc due to the convection of the filling gas, approaches the top of the light source lamp, and thus the temperature of the light source lamp rises. If the temperature of the light source lamp rises extremely, problems such as whitening and life property degradation will occur. To the contrary, when the temperature of the light source lamp is extremely low, it causes problems such as blacking and degradation in the brightness of the light source. Therefore, temperature management of the light source can impose a great influence on the quality and reliability of the projection type display apparatus.

In particular, for an apparatus that uses a plurality of light sources for the purpose of providing a projected image with a high brightness (see JP 3581568 and JP 2000-171901 A for example), temperature management of the light source is difficult. Namely, an apparatus that uses a plurality of light sources has an advantage: even when any one of the light sources has a problem that causes a failure in lighting, the projected image will not be discontinued if the remaining light source is kept lightened. On the other hand, the conditions for lighting the light sources will be complicated. In such a case, it is important to review the temperature management of light sources, with reference to the mutual influences among the plural light sources. Conventionally however, for the temperature management of light sources, only an example of reviewing a method of controlling a cooling fan for a single light source has been known (see JP 2006-106409 A for example).

In a case of using a plurality of light sources so as to combine output light from the respective light sources and radiate the display device thereby projecting an image, it should be noted that an idle component that disperses or performs unnecessary radiation is included in addition to the effective component of the output light that is combined and used as the effective light. For example, in an apparatus that combines output light from the plural light sources, a part of the output light does not function as an effective light but it radiates an opposing light source so as to raise the temperature of the thus irradiated light source. This will cause problems such as whitening of the light sources and life property degradation.

SUMMARY OF THE INVENTION

Therefore, with the foregoing in mind, it is an object of the present invention to provide a projection type display apparatus using a plurality of light sources that is capable of performing accurate and reliable control of temperature management of the light sources so as to suppress problems, such as whitening of the light sources, life property degradation, blacking and brightness degradation, thereby providing a projection type display apparatus with high quality and high reliability.

A projection type display apparatus of the present invention includes a plurality of light sources; a display device unit; a light-combining unit that combines output light from the plural light sources; a condensing unit that propagates output light from the light-combining unit to the display device unit; and a projecting unit that projects an image by the use of output light from the display device unit.

For achieving the above-mentioned object, in the projection type display apparatus of the present invention, a cooling unit having a fan is disposed on each of the plural light sources, a controlling unit is provided to control the cooling unit, and information regarding the lighting state of the plural light sources is inputted into the controlling unit, whereby the controlling unit controls a rotation rate of the fan of the cooling unit with reference to the information.

According to this configuration, with reference to information regarding the lighting state of the plural light sources, it is possible to control the rotation rate of the fan of the cooling unit disposed on each of the plural light sources. Therefore, it is possible to control the cooling effect of the cooling means with reference to the information regarding the lighting state of each of the plural light sources, and to perform cooling suitably with respect to the heat generated at the respective light sources. Thereby, it is possible to prevent whitening of the light sources, life property degradation and the like, and further prevent blacking, brightness degradation and the like so as to provide a reliable projection type display apparatus.

DETAILED DESCRIPTION OF THE INVENTION

Figure 1:
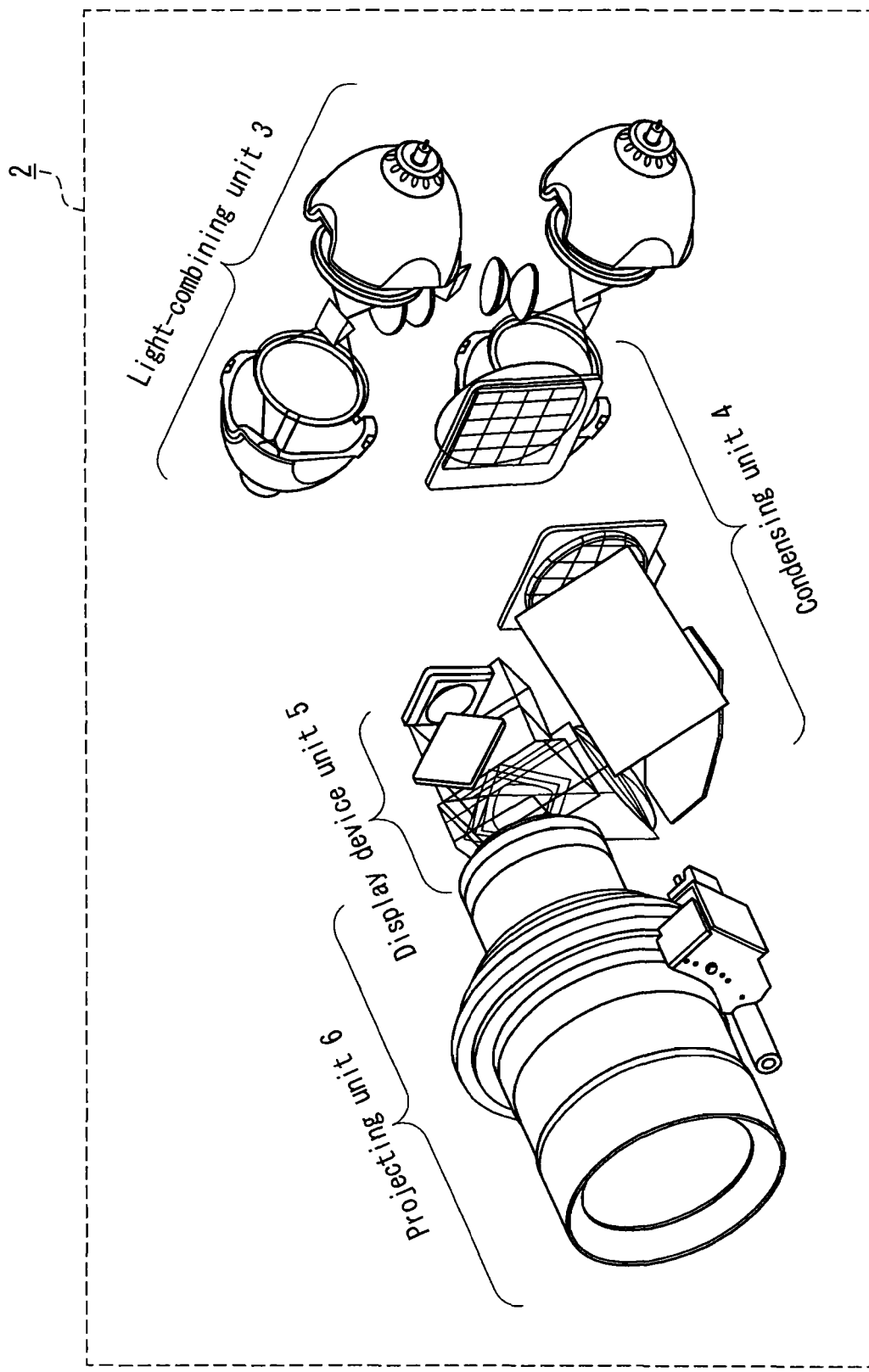
FIG. 1 is a perspective view showing configurations of the main components of a projection type display apparatus according to an embodiment of the present invention.

The projection type display apparatus of the present invention can be embodied as follows with reference to the above-mentioned configurations.

Namely, the plural light sources may include at least one pair of opposing light sources, and the controlling unit controls a driving voltage of the cooling unit disposed on each of the opposing light sources with reference to the information regarding the lighting state of the opposing light sources so as to control a rotation rate of the fan of the cooling unit.

According to this configuration, it is possible to control the driving voltage of the cooling units disposed on the respective light sources and to control the rotation rate of the fans of the cooling units, with reference to the information regarding the lighting state of the opposing light sources. As a result, it is possible to control the cooling effect of the cooling units with reference to the information regarding the lighting state of the opposing light sources, and perform suitable cooling with respective to heat generation of the opposing light sources, for example, the cooling effect of the cooling units is improved in a case where both the opposing light sources are turned on. Thereby, it is possible to provide a reliable projection type display apparatus where degradation of the light sources and life property degradation are difficult to occur.

The projection type display apparatus further may include a rotation sensing unit that senses the rotation rate of the fan of the cooling unit, thereby controlling the rotation rate of the fan of the cooing unit to a predetermined rotation rate with reference to the information outputted from the rotation sensing unit. According to this configuration, it is possible to sense the rotation rate of the fans of the cooling unit by the rotation sensing unit so as to control the rotation rate of the fans of the cooling unit to a predetermined rotation rate, thereby performing the control of the rotation rate of the cooling unit accurately and reliably.

The projection type display apparatus further may include a temperature detecting unit, an atmospheric pressure detecting unit and an installation posture detecting unit, thereby controlling the rotation rate of the fan of the cooling unit with reference to information outputted from the temperature detecting unit, the atmospheric pressure detecting unit and the installation posture detecting unit and also information regarding the lighting state of the plural light sources. According to this configuration, it is possible to control the rotation rate of the fans of the cooling unit with reference to not only information regarding the lighting state of the light sources but the information outputted from the temperature detecting unit, the atmospheric pressure detecting unit and the installation posture detecting unit. Therefore, in positioning the projection type display apparatus, temperature of the positioning site, altitude and vertical/horizontal installation posture can be regarded as the requirements in controlling the cooling unit. And thus, it is possible to improve the control quality and cooling efficiency of the cooling unit, and to perform a further reliable and suitable cooling with respect to the light sources.

Furthermore, the cooling unit disposed on each of the plural light sources further may comprise an air duct and an air volume control valve disposed inside the air duct, and the controlling unit controls the rotation rate of the fan of the cooling unit and the air volume control valve with reference to the information regarding the lighting state of the plural light sources.

According to the configuration, it is possible to control the rotation rate of the fans of the cooling unit and the air volume control valve disposed inside the air duct of the cooling unit, and thus, control of the cooling unit can be performed efficiently and reliably.

Hereinafter, an embodiment of the present invention will be described with reference to FIGS. 1-9.

Embodiment

First, an optical system in a projection type display apparatus according to an embodiment of the present invention hereinafter it will be abbreviated as 'the present apparatus') will be described generally with reference to FIGS. 1 and 2. FIG. 1 is a perspective view showing a schematic configuration of an optical system 2 of the present apparatus, and FIG. 2 shows a basic configuration of each of four light-combining optical systems in the optical system 2.

The optical system 2 using four light sources includes a light-combining unit 3, a condensing unit 4, a display device unit 5 and projecting unit 6. As shown in FIG. 2, the light-combining unit 3 is a light-combining means that combines output light from four light source lamps 7a, 7b, 7c and 7d. The display device unit 5 is composed of an image display device such as DMD (Digital Micromirror Device). The condensing unit 4 is a condensing means that propagates output light from the light-combining unit 3 to the display device unit 5. The projecting unit 6 is a projecting means that projects an image by the use of output light from the display device unit 5.

Figure 2:
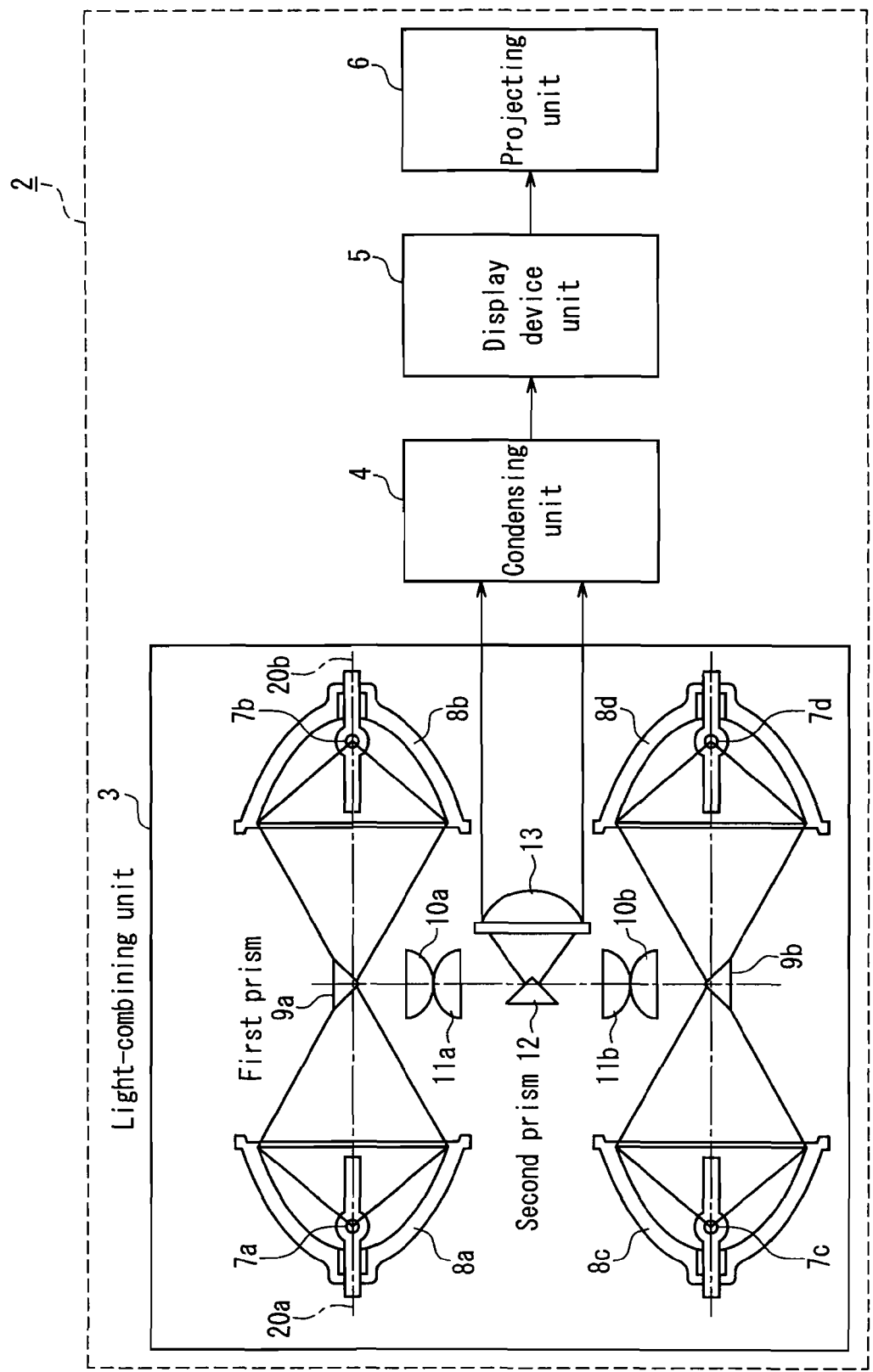
FIG. 2 is a view showing a basic configuration of a light-combining unit of the projection type display apparatus.

As shown in FIG. 2, the four light source lamps 7a-7d are disposed respectively on the interiors of the concave mirrors 8a, 8b, 8c and 8d each having an elliptical cross section. Extra-high pressure mercury lamps are used for the light source lamps 7a-7d. On the inner surface of a glass member of the concave mirrors 8a-8d, dielectric optical multilayer films are formed for transmitting infrared light and reflecting visible light.

Hereinafter, main components and functions of the optical system 2 will be described. Output light beams from the light source lamps 7a-7d are condensed respectively by the concave mirrors 8a-8d, and the light source images are formed on the mirror surfaces of the synthetic prisms 9a, 9b and reflected toward the condensing lenses 10a, 10b.

Light beams outgoing from the synthetic prisms 9a, 9b are diverged and then pass through condensing lenses 10a, 10b, 11a, 11b so as to be converged and reflected again as divergent light on the mirror surface of the synthetic prism 12, which reaches the condensing unit 4 through a condensing lens 13.

The synthetic prisms 9a, 9b and 12 are triangular prisms whose cross sections are isosceles triangles, and each having a light incidence surface on which is formed a dielectric multilayer film mirror prepared by laminating alternately a low-refractive index material and a high refractive index material. Since the output light beams from the light source lamps 7a-7d are condensed on a minute area, a material having excellent heat resistance and UV resistance is used for the multilayer film for forming the mirror surface.

The condensing unit 4 includes a condensing lens (not shown), a mirror (not shown) and the like, and adjusts the traveling path of the output light from the light-combining unit 3 to be propagated to the display device unit 5.

The display device unit 5 includes a total reflection prism (not shown) and a reflection light bulb (not shown) as an image display device, and forms a projected image. The reflection light bulb has mirror elements arranged in matrix for each pixel that can modulate the traveling direction of the light in accordance with the video signal so as to form an optical image as a change in the reflection angle.

An optical image formed by the display device unit 5 is outputted to the projecting unit 6, and projected on a screen (not shown) by a projection lens of the projecting unit 6.

Though a reflection type light bulb that modulates the traveling direction of light is used as the light bulb in the present embodiment, similar effects can be obtained even by using a light bulb that modulates the polarization direction and scattering state of light or a transmission type light bulb.

Figure 3A:
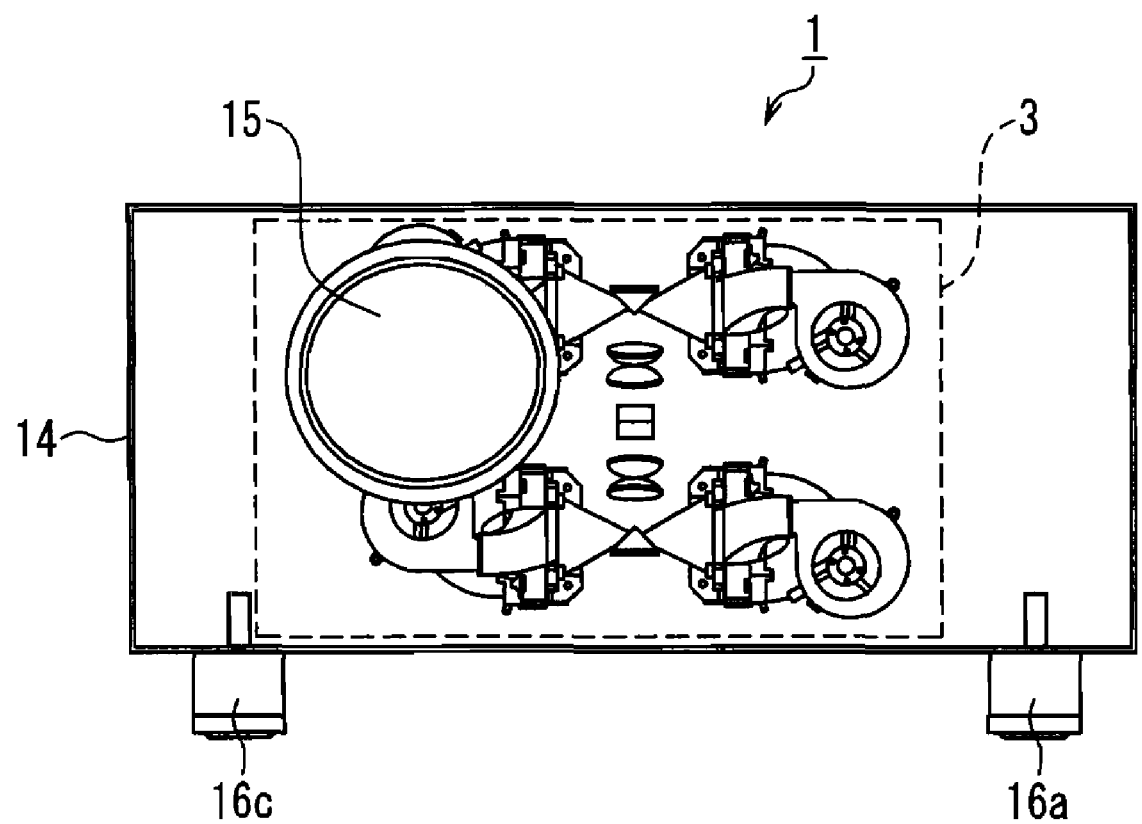
FIGS. 3A-3C are views showing layouts of main components of an optical system of the projection type display apparatus.
Figure 3B:
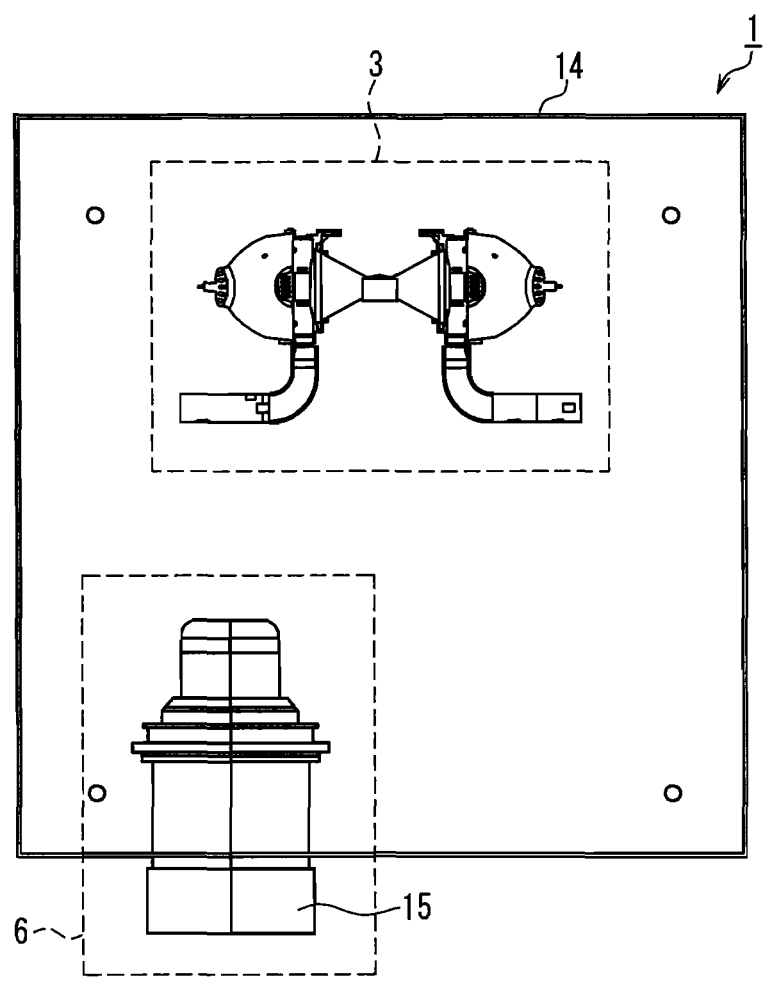
Figure 3C:
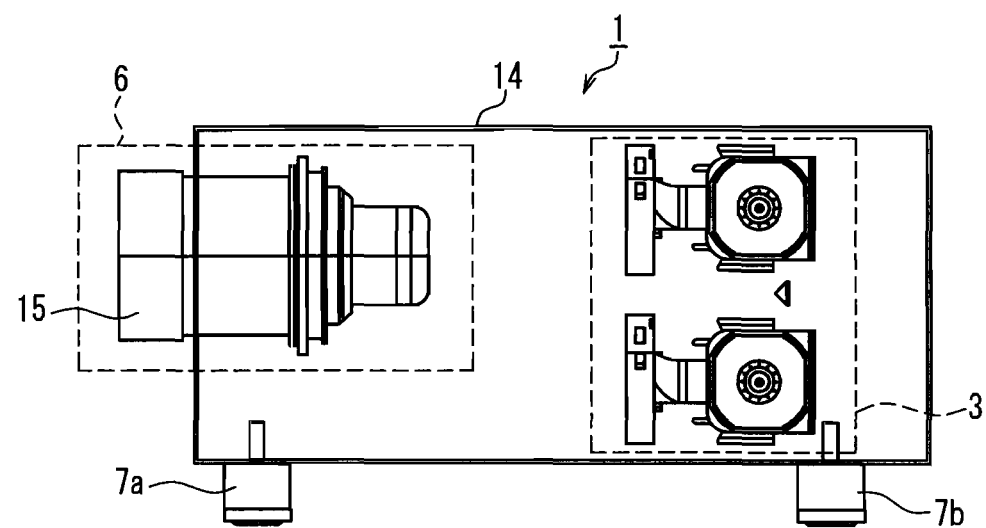

Next, the schematic configuration of the present apparatus 1 will be described with reference to FIGS. 3-6. FIGS. 3A-3C show layouts of main mechanism elements forming the optical system 2 mounted in the present apparatus 1; FIG. 3A is the front view; FIG. 3B is the plan view; and FIG. 3C is the side view.

In the present apparatus 1, the light-combining unit 3 and the projecting unit 6 as the main mechanism elements for forming the optical system 2 are arranged inside a cabinet 14 as shown in FIGS. 3A-3C. A projection lens 15 at the end of the projecting unit 6 protrudes from the cabinet 14. On the cabinet 14, legs 16a, 16b and 16c are provided.

Figure 4A:
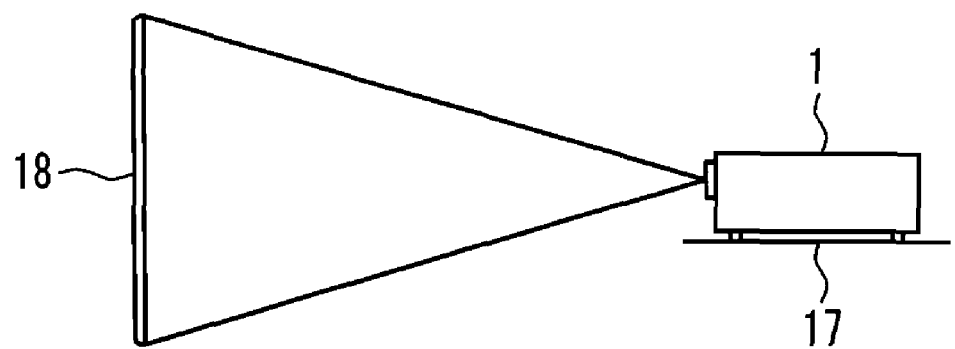
FIGS. 4A-4D are views showing positions of the projection type display apparatus.
Figure 4B:
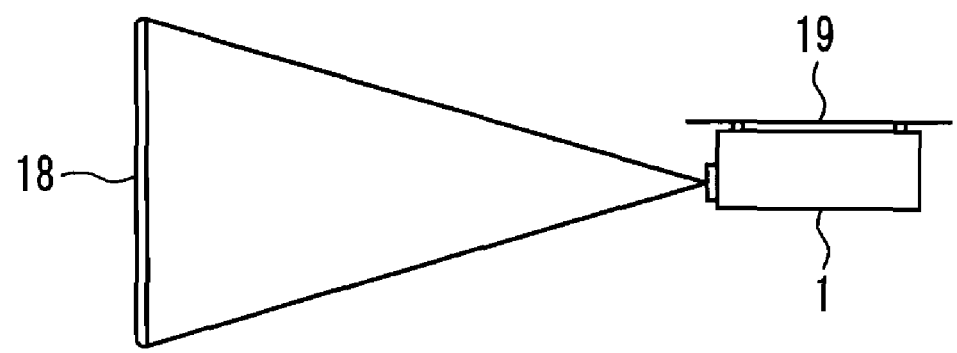
Figure 4C:
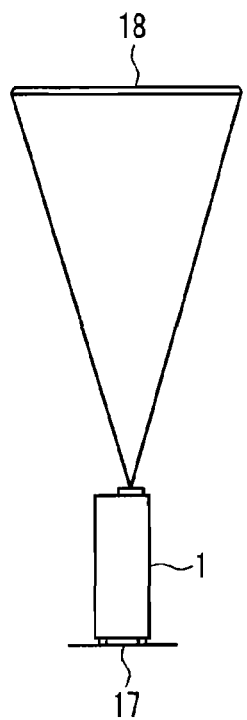
Figure 4D:
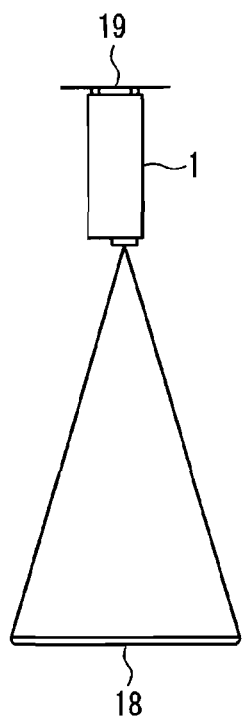

FIGS. 4A-4D are views for showing various installation postures of the present apparatus 1. As shown in FIG. 4A, the present apparatus 1 in general is mounted on a support table 17 and used in a form of projecting on a screen 18 in a horizontal installation posture. However, it is also possible to project a display image in a state attached to the ceiling 19 as shown in FIG. 4B, or arranged vertically facing right above or right below as shown in FIGS. 4C and 4D.

Figure 5:
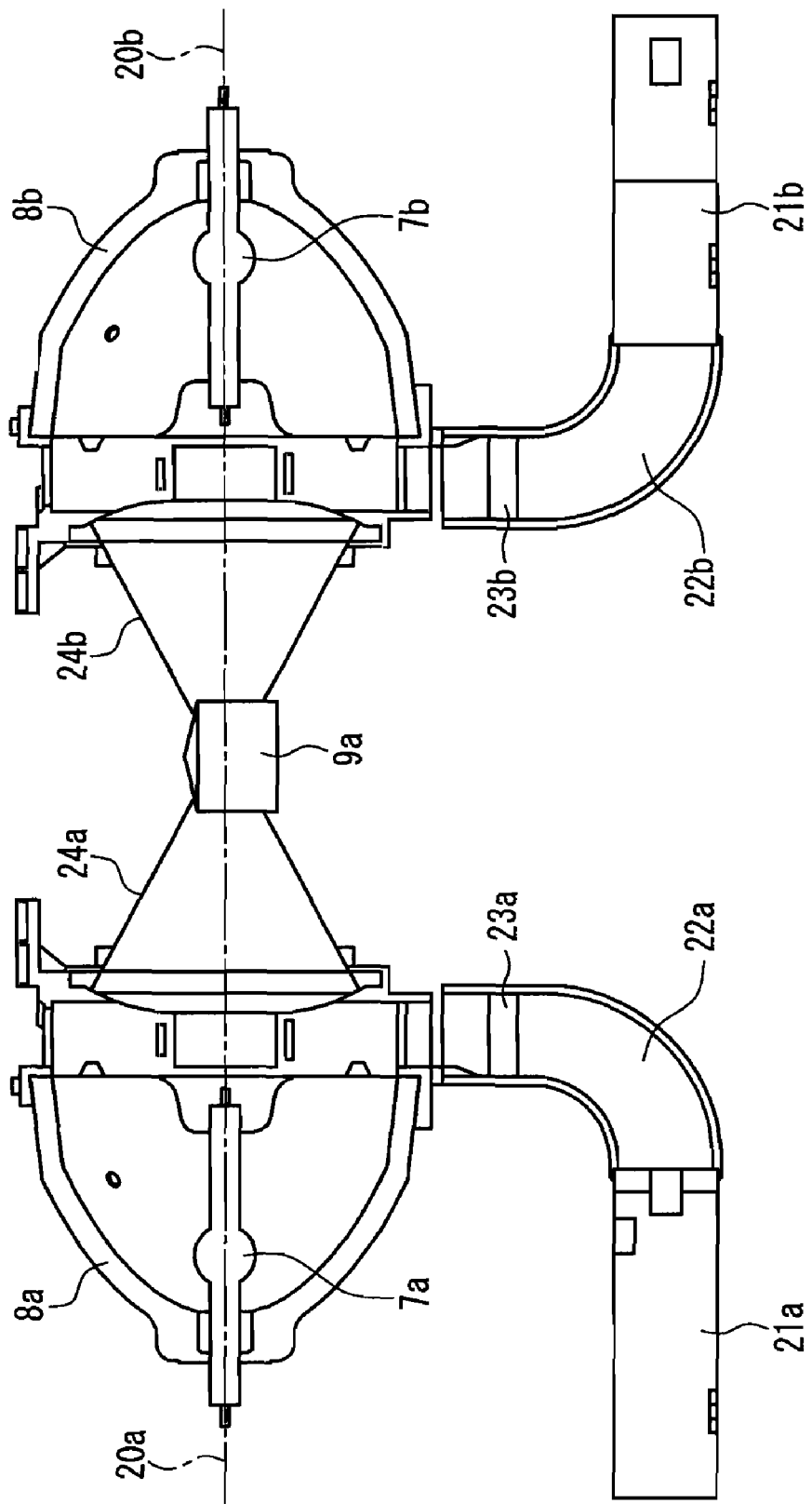
FIG. 5 is a plan view showing a part of the optical system of the projection type display apparatus in an enlarged cross-section.

FIG. 5 is a plan view showing a part of FIGS. 3A-3C in an enlarged cross-section, which shows the mutual relationship between the two opposing light source lamps 7a and 7b, and a structural example of a cooling means disposed on the light source lamps 7a, 7b in the light-combining unit 3.

The light source lamps 7a, 7b respectively disposed on the interiors of the concave mirrors 8a, 8b are configured so that the optical axes 20a and 20b match each other. To the light source lamp 7a, a centrifugal fan (hereinafter abbreviated as 'cooling fan') 21a is connected via an air duct 22a including an air volume control valve 23a. Similarly, to the light source lamp 7b, a cooling fan 21b is connected via an air duct 22b including an air volume control valve 23b. Numerals 24a, 24b, 24c and 24d denote light guide.

The other pair of opposing light source lamps 7c, 7d forming the light-combining unit 3 have a mutual relationship and cooling means configured similarly to those of the light source lamps 7a, 7b as shown in FIG. 5.

Figure 6:
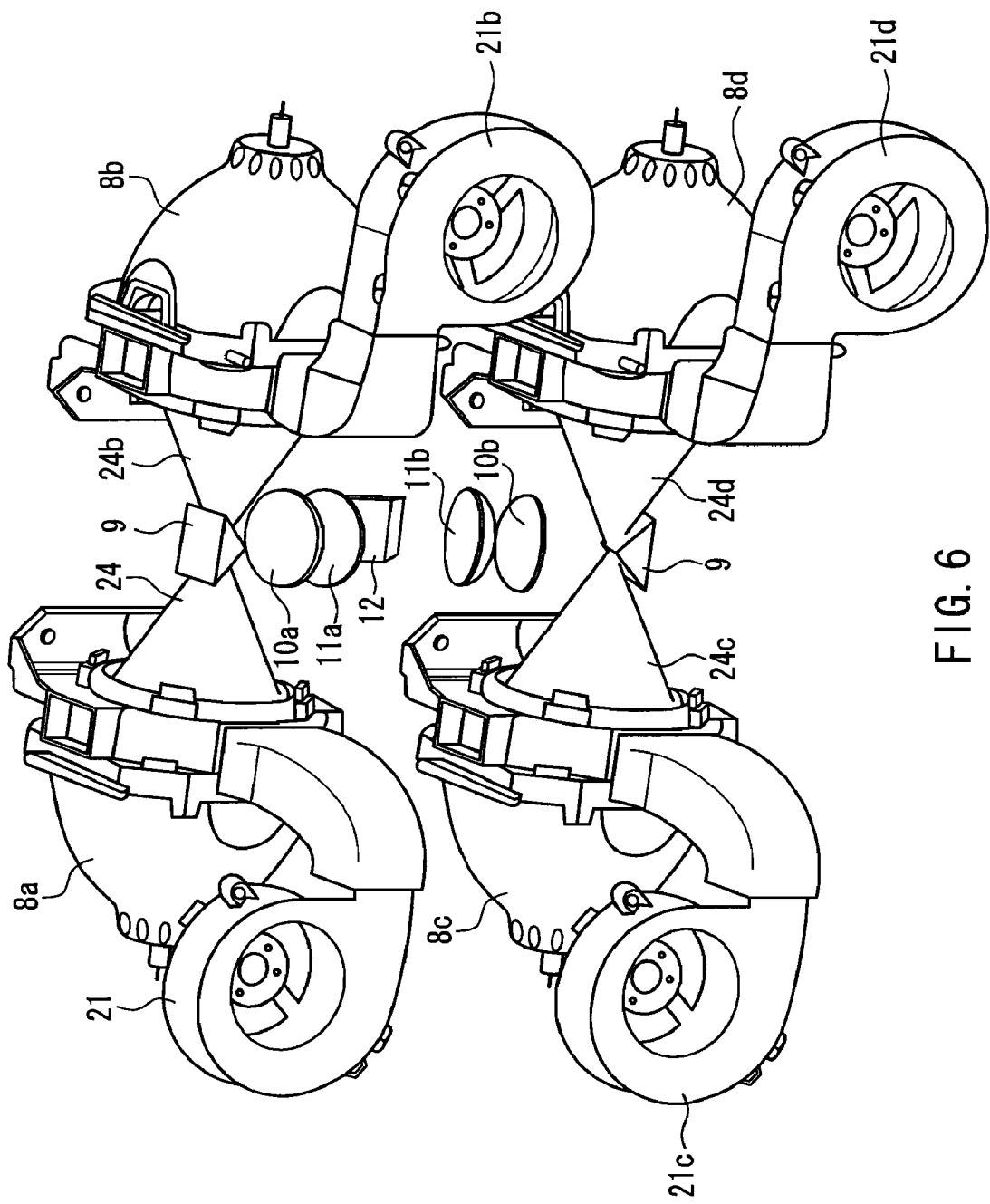
FIG. 6 is a perspective view showing main components of the light-combining unit of the projection type display apparatus.

FIG. 6 is a perspective view showing main components for the light-combining unit 3 of the present apparatus 1. This drawing shows the appearance of the layout of the concave mirrors 8a-8d accommodating two pairs of opposing light source lamps 7a-7d, as the whole structure of the light-combining unit 3.

Output light beams from the light source lamps 7a, 7b are reflected by the concave mirrors 8a, 8b and then pass through the interiors of the light guides 24a, 24b with their optical axes matched. Further, the light beams are reflected again by the first synthetic prism 9a and reach the second synthetic prism 12 via the condensing lenses 10a, 11a, which then are combined with output light beams coming from the other pair of opposing light source lamps 7c, 7d.

It is possible also to ventilate using the cooling fans 21a, 21b, 21c and 21d respectively so as to cool the light source lamps 7a-7d heated during the lighting. Further, by operating the air volume control valves 23a, 23b and the like (see FIG. 5), the air volume supplied by the cooling fans 21a-21d can be adjusted.

The air volume control valve 23a can have a structure adjustable to differentiate the air volumes between the upper side and the lower side of the cross section of the air duct 22a in the direction perpendicular to the surface of FIG. 5. Thereby it is possible to control so that either the upper side or the lower side of the light source lamp 7a can be cooled more strongly than the other. This control is effective in performing an approximate cooling in accordance with the installation posture of the present apparatus 1.

The following description refers to a control for temperature management of the light source lamps 7a-7d in the present apparatus 1, which characterizes the present invention.

Figure 7A:
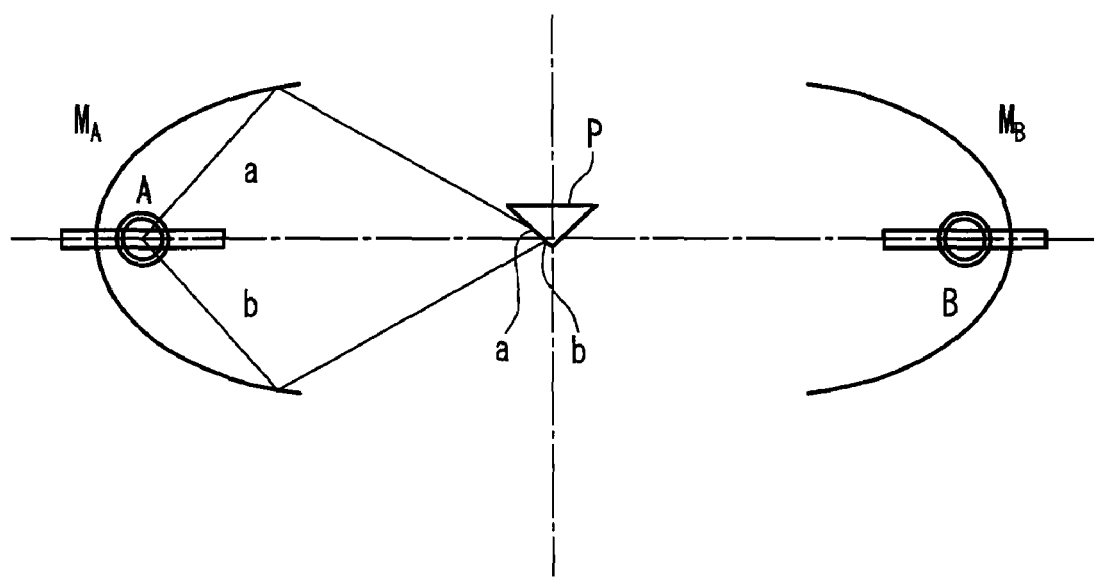
FIGS. 7A and 7B are views showing optical characteristics for the light-combining unit of the projection type display apparatus.
Figure 7B:
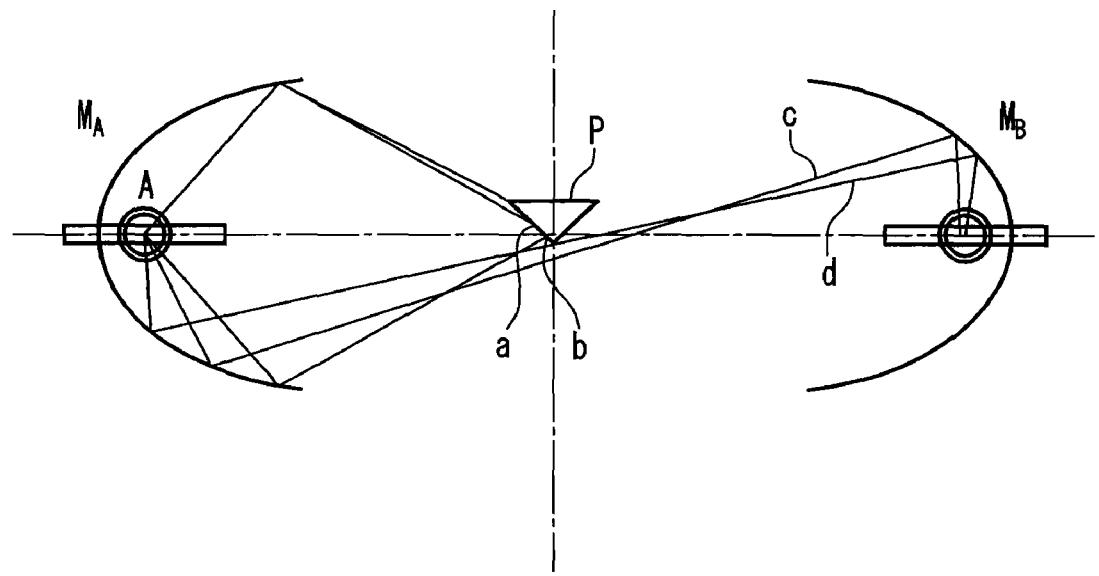

FIGS. 7A and 7B show the optical characteristics of the output light in a case of lighting the light source lamp. As shown in FIG. 7A, the output light from the light source A is reflected on a concave mirror MA and a prism P so as to form divergent light beams a and b that travel as effective light on optical paths. On the other hand, FIG. 7B shows existence of light fluxes c and d straying from the prism P, other than the divergent light beams a, b. These light fluxes are reflected by the concave mirror MB of the opposing light source B and reaches the light source B. As a result, when the light sources A and B are turned on simultaneously, the light sources will be irradiated mutually with a part of the output light, and thus the temperature of the light sources will rise further in comparison with a case where only one of the light sources is turned on.

As mentioned above, in a case of using a plurality of light sources to combine the output light from the respective light sources and radiate the display device so as to project an image, it should be noted that there is an idle component that is scattered or radiates unwantedly, other than the effective component of output light combined and used as effective light. Specifically, in a system of combining output light from a plurality of light sources, the temperature of the light sources will rise excessively due to radiation from the opposing light sources, and it causes problems such as whitening of the light sources and life property degradation.

With respect to this, in the present apparatus 1, a measure for appropriate temperature management of the light source lamps 7a-7d is taken. Namely, the cooling fans 21a-21d are disposed respectively on the light source lamps 7a-7d, and the rotation rate of the cooling fans 21a-21d is controlled depending on the circumstances. Thereby, the cooling fans 21a-21d are controlled to vary the rotation rate in accordance with the lighting state of the opposing light source lamps, and thus it is possible to prevent excessive temperature rise in the four light sources.

Figure 8:
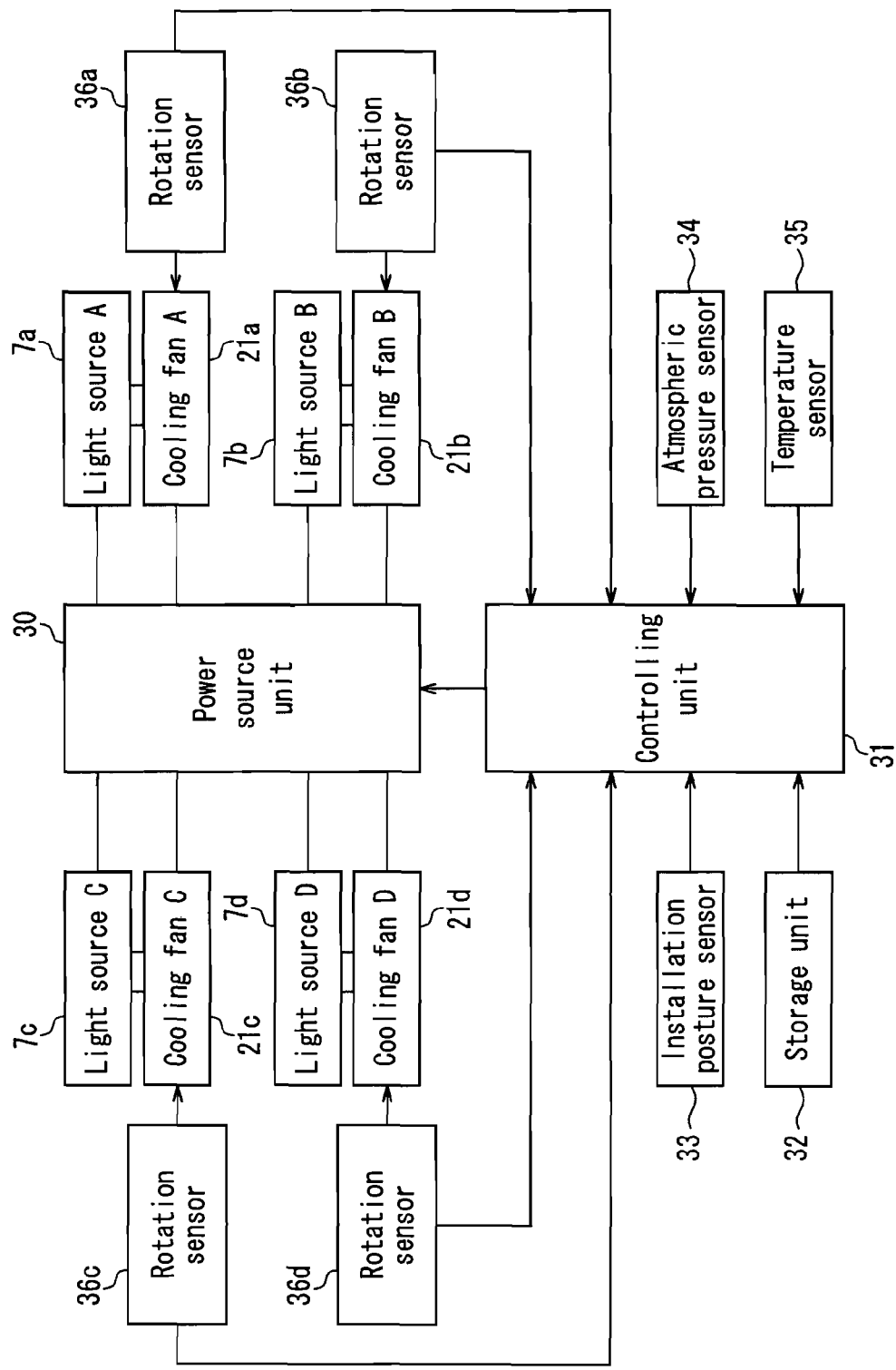
FIG. 8 is a block diagram concerning a control of the light sources and the cooling fans of the projection type display apparatus.

An explanation will be made with reference to FIG. 8 of a configuration for deciding the lighting state of the light source lamps and driving the cooling fans in accordance with the decision for the purpose of appropriate temperature management of the light source lamps 7a-7d in the present apparatus 1. FIG. 8 is a block diagram showing a configuration concerning the control of the light source lamps and the cooling fans in the present apparatus 1.

For controlling the light source lamps and the cooling fans, the present apparatus 1 has a power source unit 30, a controlling unit 31 and a storage unit 32. To the power source unit 30, the respective light source lamps 7a, 7b, 7c, 7d and the respective cooling fans 21a, 21b, 21c, 21d are connected independently, and thus every light source lamp and cooling fan can be driven and controlled independently with reference to instruction information received from the controlling unit 31.

The controlling unit 31 connected to the power source unit 30 transmits instruction information to the power source unit 30 so as to instruct a drive control regarding all of the light source lamps and the cooling fans. The instruction information relates to ON/OFF of the power source, drive voltage, drive current, ventilation control (flow rate control) and the like regarding the light source lamps and the cooling fans. As a result, the lighting state of the light source lamps 7a-7d can be detected with reference to the drive voltage, drive current and the like in the controlling unit 31. To the controlling unit 31, rotation sensors 36a, 36b, 36c, 36d, an installation posture sensor 33, an atmospheric pressure sensor 34 and a temperature sensor 35 are connected respectively.

The rotation sensors 36a-36d are disposed respectively on the cooling fans 21a-21d so as to detect the rotation rate of the cooling fans and transmit the detected information to the controlling unit 31.

The installation posture sensor 33 has a function of detecting the installation posture of the present apparatus 1, and can transmit the detected information to the controlling unit 31. The installation posture sensor 33 is disposed (not shown) inside the cabinet 14 (FIG. 3) of the present apparatus 1. For composing the sensor, a pressure-sensitive element or the like can be used.

The atmospheric pressure sensor 34 can detect the atmospheric pressure at the site where the present apparatus 1 is positioned and transmit detected information to the controlling unit 31. The atmospheric pressure sensor 34 is composed of a pressure-sensitive element or the like similarly to the installation posture sensor 33, and is disposed inside or outside the cabinet 14 of the present apparatus 1.

The temperature sensor 35 detects the atmospheric temperature at the site where the present apparatus 1 is positioned, and can transmit the detected information to the controlling unit 31. The temperature sensor 35 is disposed in the vicinity of an intake port of the cabinet 14 of the present apparatus 1.

In the storage unit 32, a control program, a database and the like for determining the condition for controlling the light source lamps and the cooling fans with reference to information received from the respective sensors as mentioned above are stored in advance.

Figure 9:
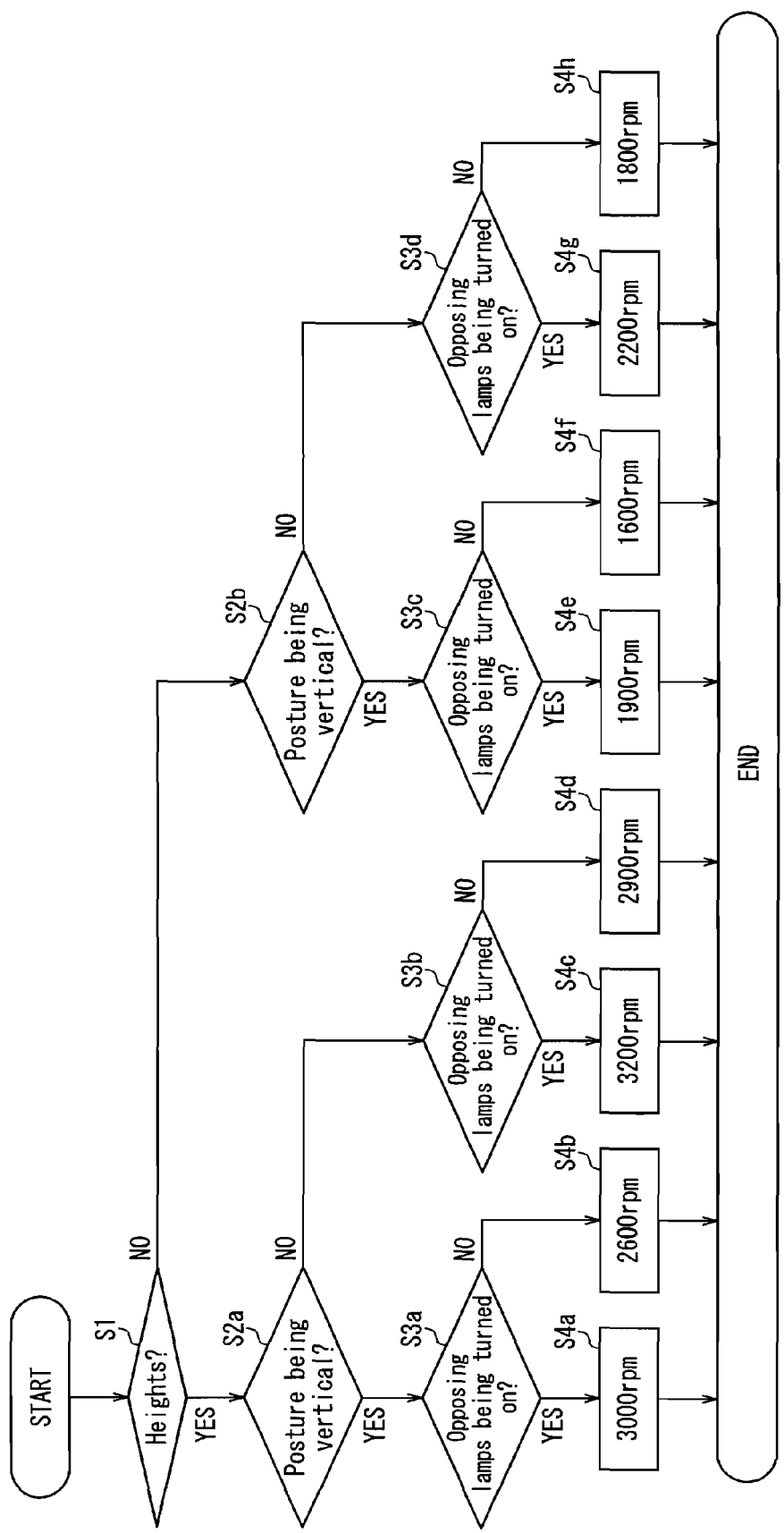
FIG. 9 is a block diagram showing a process of controlling the cooling fans of the projection type display apparatus.

Next, a process of temperature management of the light source lamps 7a-7d in the present apparatus 1, characterizing the present invention, will be described with reference to FIG. 9. Namely, the description below refers to a process of deciding the lighting state of the light source lamps 7a-7d and controlling the rotation rate of the cooling fans 21a-21d accordingly.

When the process of controlling the rotation rate of the cooling fans starts, a decision is made on the altitude of the position of the present apparatus 1 so as to be divided into two categories. Namely, the present apparatus 1 includes an atmospheric pressure sensor 34, and decides whether being at "heights" or not on the basis of the detected atmospheric pressure (step S1). Thereby, with reference to the information regarding the relationship between the atmospheric pressure and the cooling efficiency of the cooling fan, instructions on the control of rotation rate of the cooling fan are classified depending on whether being at "heights" or not. Namely, when being at "heights" (YES), the operation goes to a step S2a; when not being at "heights" (NO), the operation goes to a step S2b.

In each of the steps S2a and S2b, a decision on the installation posture of the present apparatus 1 is made. Since the efficiency of the cooling fan differs depending on the installation posture, the present apparatus 1 classifies the instructions on the control of the rotation rate of the cooling fan depending on whether the present apparatus 1 is directed horizontally or vertically. Namely, from the step S2a, the operation goes to a step S3a if the installation posture is vertical (YES); and, if the installation posture is horizontal (NO), the operation goes to a step S3b. Similarly from the step S2b, the operation goes to a step S3c or a step S3d.

In each of the steps S3a, S3b, S3c, S3d, a decision is made whether to simultaneously turn on or not the opposing light source lamps such as the light source lamps 7a, 7b (or light source lamps 7c, 7d). When the opposing light source lamps are not turned on simultaneously, a temperature rise due to mutual radiation is not caused However, when the light source lamps are turned on simultaneously, an increased temperature rise of the light sources will be caused due to the influence of the mutual radiation. Therefore, depending on whether to simultaneously turn on or not the opposing light source lamps, classification of instructions on the rotation rate control of the cooling fans is made and the operation goes to any of steps S4a-S4h, thereby determining the rotation rate of the cooling fans 21a-21d.

The change in the lighting state of the opposing light source lamps may be caused depending on various factors. The examples can include a case of selecting intentionally a lighting state for the sake of management of the handling, and a case where the change occurs due to damage in the light source lamp. Controlling the rotation rate of the cooling fans in accordance with the lighting state is effective in, for instance, avoiding an excessive temperature rise, and avoiding unwanted noise caused by the excessive increase in the rotation rate of the cooling fans.

According to the above-mentioned processes, the lighting state of the light source lamps is decided in the steps S3a-S3d. As shown in FIG. 9, the controlled rotation rate of the cooling fans are classified into 8 stages (the steps S4a-S4h) within a range of 1,800 rpm to 3,200 rpm, and selection of the rotation rate of the cooling fans is carried out in accordance with the decision result on the lighting state.

Alternatively, it is possible to decide the ambient temperature of the positioned apparatus 1 and classify the instructions on the rotation rate control of the cooling fans. Namely, even if the other conditions are equal, the rotation rate is shift to the higher class when the ambient temperature is high, and the rotation rate is shift to the lower class when the ambient temperature is low. Thereby, the noise problem in the operation can be solved without causing unwanted rise in the rotation rate of the cooling fans. For this purpose, in FIG. 9 for instance, an option of the rotation rate category according to the ambient temperature can be provided as a step subsequent to the step S3a-S3d.

Furthermore, for the altitude of the positioning site and the installation posture, it is also possible to input the information of altitude of the present apparatus 1 and the installation posture at the time of positioning, without providing a sensor.

As mentioned above, according to the projection type display apparatus of the present invention, an accurate and reliable control can be carried out for a temperature management of a plurality of light sources used in a projection type display apparatus, thereby problems such as whitening of the light sources, life property degradation, blacking and brightness degradation can be suppressed and thus a small and reliable projection type display apparatus with an ultra-high brightness can be provided.

Though four light sources are used in the above-described embodiment, it is needles to note that such a projection type display apparatus can have two or more than four light sources, based on a similar concept.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A projection type display apparatus comprising:
a plurality of light sources;
a display device unit;
a light-combining unit that combines output light from the plural light sources;
a condensing unit that propagates output light from the light-combining unit to the display device unit; and
a projecting unit that projects an image by the use of output light from the display device unit,
wherein a cooling unit having a fan is disposed on each of the plural light sources;
a controlling unit is provided so as to control the cooling unit, and
information regarding the lighting state of the plural light sources is inputted into the controlling unit, whereby the controlling unit controls a rotation rate of the fan of the cooling unit with reference to the information.

2. The projection type display apparatus according to claim 1, wherein the plural light sources include at least one pair of opposing light sources, and the controlling unit controls a driving voltage of the cooling unit disposed on each of the opposing light sources with reference to the information regarding the lighting state of the opposing light sources so as to control a rotation rate of the fan of the cooling unit.

3. The projection type display apparatus according to claim 2, further comprising a rotation sensing unit that senses the rotation rate of the fan of the cooling unit, so as to be used for controlling the rotation rate of the fan of the cooing unit to a predetermined rotation rate with reference to the information outputted from the rotation sensing unit.

4. The projection type display apparatus according to claim 1, further comprising a temperature detecting unit, an atmospheric pressure detecting unit and an installation posture detecting unit, thereby controlling the rotation rate of the fan of the cooling unit with reference to information outputted from the temperature detecting unit, the atmospheric pressure detecting unit and the installation posture detecting unit and also information regarding the lighting state of the plural light sources.

5. The projection type display apparatus according to claim 1, wherein the cooling unit disposed on each of the plural light sources further comprises an air duct and an air volume control valve disposed inside the air duct, and the controlling unit controls the rotation rate of the fan of the cooling unit and the air volume control valve with reference to the information regarding the lighting state of the plural light sources.

* * * * *